United States Patent

[11] 3,623,130

| | | |
|---|---|---|
| [72] | Inventor | Desmond G. Dalrymple<br>Deep River, Ontario, Canada |
| [21] | Appl. No. | 825,140 |
| [22] | Filed | May 16, 1969 |
| [45] | Patented | Nov. 23, 1971 |
| [73] | Assignee | Atomic Energy of Canada Limited<br>Ottawa, Ontario, Canada |

[54] TARGET ASSEMBLY FOR A THERMAL NEUTRON GENERATOR
2 Claims, 1 Drawing Fig.

[52] U.S. Cl............................................ 250/84.5,
313/61
[51] Int. Cl......................................... G21g 3/04
[50] Field of Search............................. 250/84.5;
313/61; 176/11

[56] References Cited
UNITED STATES PATENTS

| 3,349,001 | 10/1967 | Stanton ......................... | 250/84.5 X |
| 3,453,175 | 7/1969 | Hodge ........................... | 250/84.5 X |
| 3,500,098 | 3/1970 | Fraser ........................... | 313/61 |

Primary Examiner—Archie R. Borchelt
Attorney—Christen, Sabol & O'Brien

ABSTRACT: A target assembly for a thermal neutron generator wherein an elongated target tube has a top end receiving liquid metal and a bottom end receiving a windowless proton beam tube; the liquid metal enters the target zone with a swirl causing the liquid metal to adhere to the wall of the target tube so as not to enter the proton beam tube.

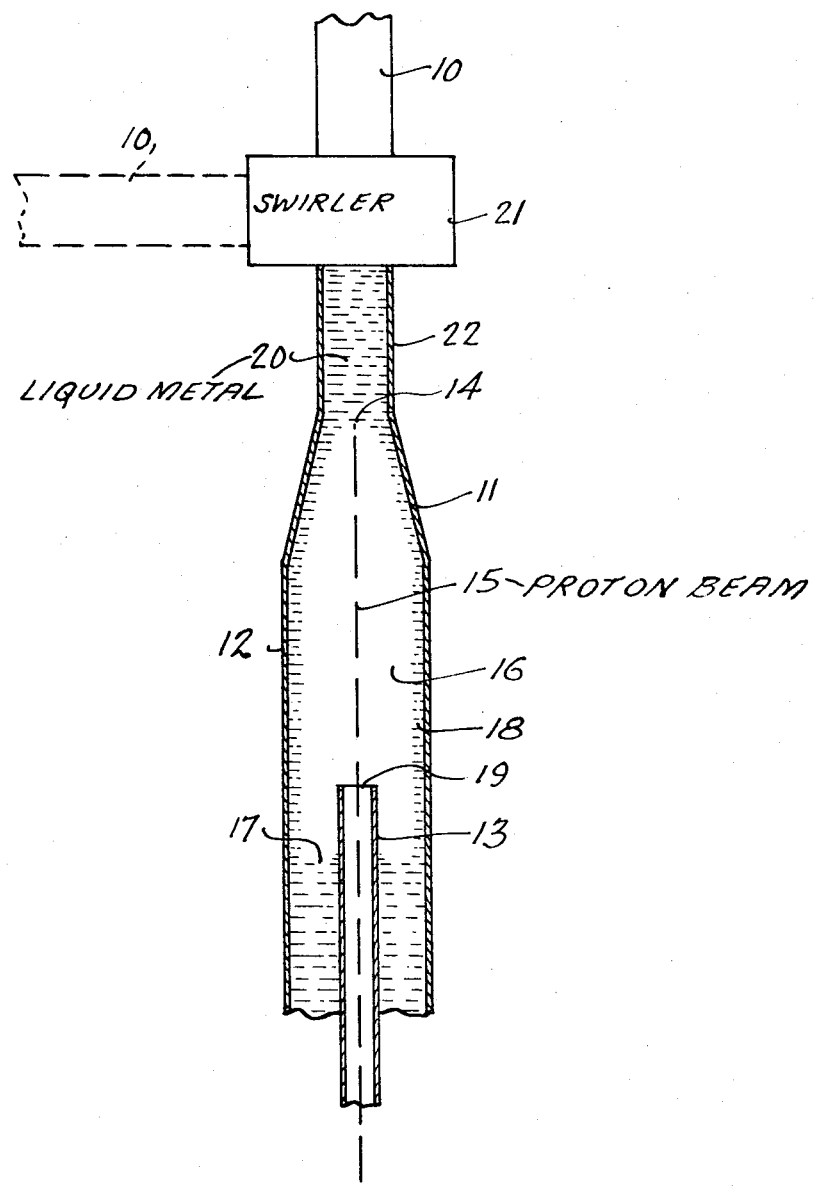

TARGET ASSEMBLY FOR A THERMAL NEUTRON GENERATOR

The present invention relates to a new and improved target assembly for use with a thermal neutron generator of the kind disclosed in U.S. application Ser. No. 501,623, Oct. 22, 1965, (now U.S. Pat. No. 3,500,098) in the name of John S. Fraser. In this prior application, an intense neutron generator is shown having a target tube filled with a liquid metal target which is irradiated by a proton beam. The liquid metal enters from the top of the tube as does the windowless beam tube. A considerable simplification of the structure of the neutron generator would be obtained if the target were constructed so that the beam tube enters the target from below whereas the target metal continues to enter the target tube from above.

The present invention provides such a target system consisting of a target tube of generally elongated configuration and positioned with its axis vertical, a windowless proton beam tube enters the target tube from below and a liquid metal enters the target tube from above. The liquid metal enters the target zone with an initial swirl which causes the liquid metal to adhere to the wall of the target tube, thus the liquid metal does not enter the proton beam tube.

In the drawing which illustrates schematically a vertical section through a target tube constructed in accordance with the present invention there is shown the target zone comprising a supply pipe 10, a swirler 21, a cylindrical section 22, a conical section 11, and an enlarged cylindrical section 12. The proton beam tube 13 is positioned in the cylindrical section 12, the beam tube 13 having an open end 19 facing upwardly. The liquid metal 20 enters the target area via supply pipe 10 at the top and is provided with an initial swirl by means of vanes or nozzles in the swirl inducer 21. The dotted lines to the left of the swirler 21 indicate that the supply pipe 10 could enter the swirler 21 for example tangentially, rather than from above. The liquid metal is held against the wall of of the target tube by induced swirl and diverges in the area of the conical section 11 to provide a target interface 14 against which the proton beam 15 impinges. An evacuated core 16 is formed within the cylindrical section 12 the evacuated region extending below the open end 19 of the proton beam tube 13 to an hydraulic jump 17 where the liquid metal contacts the sides of the proton beam tube 13.

In operation, the swirling liquid metal, for example a lead bismuth eutectic, flows downward in section 22, diverging at 14 to form the target. The flow continues past the beam tube opening 19 as an annular film before undergoing an hydraulic jump to fill the annular space between the target and beam tubes. The flow mechanism by which the target interface is generated is believed to be a vortex breakdown phenomenon. It has been experimentally verified that the flow through the target area occurs as described above and that an annular film 18 if formed in the portion 12 of the target tube with the liquid returning to contract with the proton beam tube at the hydraulic jump 17.

The swirl angle, that is the angle between the vertical and the flow entering the cylindrical section 22 at the top should be approximately 30° to 45°. Axial velocities in the incoming pipe 10 would be for example up to 30 ft. per second and the angle of the conical section 11 (total included angle) would be of the order of 20° to 40°.

The present invention provides a novel form of target for an intense neutron generator thermal neutron facility which considerably simplifies the construction of the neutron generator while permitting the use of a windowless proton beam tube in the target tube.

I claim:

1. In an intense thermal neutron generating facility in which a proton beam from a windowless beam tube impinges against a liquid metal target to generate an intense neutron flux, the improvement comprising a target tube having its axis positioned substantially vertically, swirl inducing means at the top of the target tube for causing a downward flow to swirl at an angle with respect to the axis of the tube, a divergent conical section in the target tube below the swirl inducing means, an enlarged cylindrical section of the target tube below the conical section, and a beam tube in said target tube adapted to project a proton beam upward to contact the liquid metal target interface within the conical portion of the target tube.

2. The invention as claimed in claim 1 in which said swirl inducing means imparts a swirl angle of between about 30° and 45° and the total included angle of the conical section is between about 20° and 40°.

* * * * *